Figure 1:
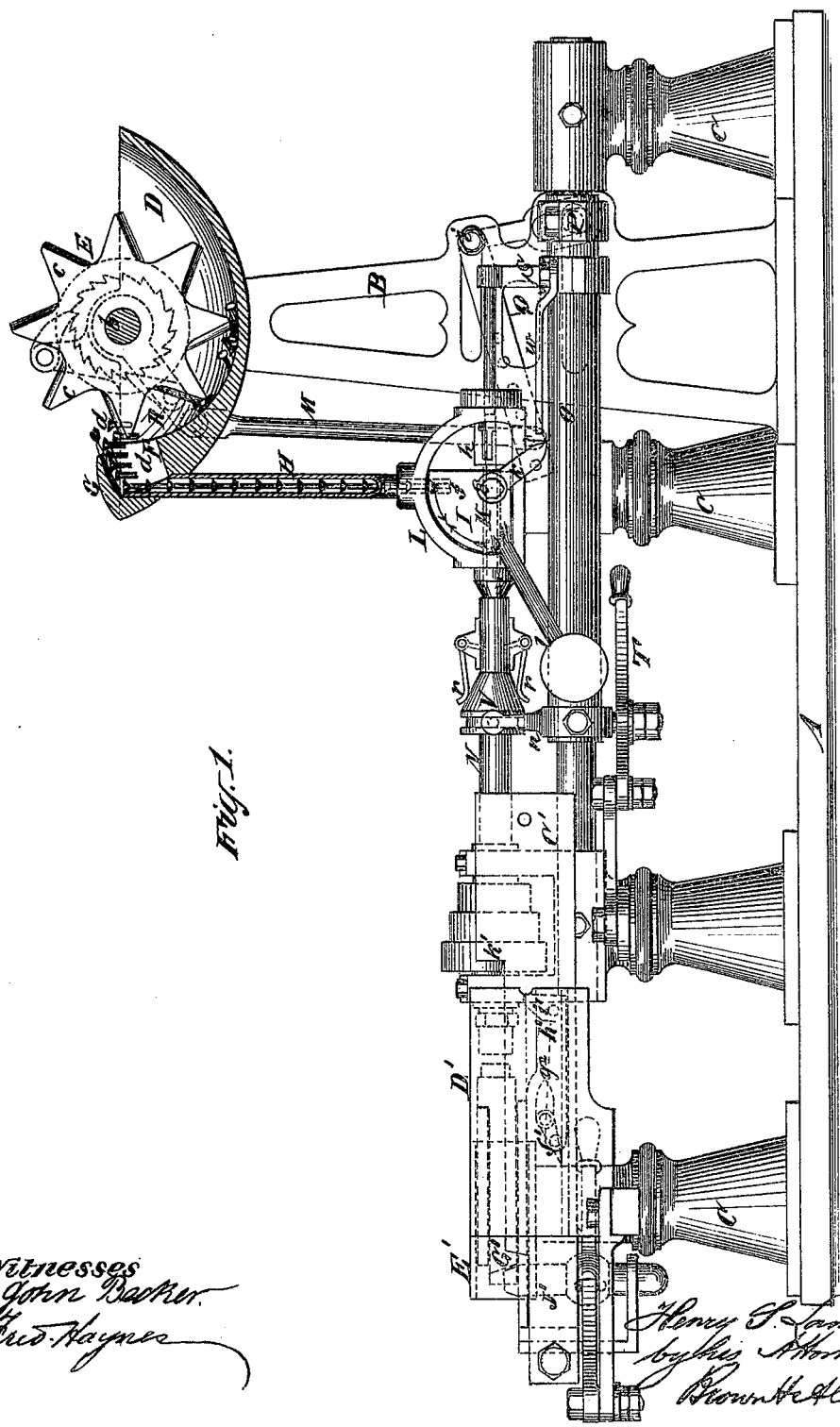

3 Sheets—Sheet 1.

H. S. LANSDELL.
MACHINE FOR THREADING METAL SCREWS.

No. 189,754. Patented April 17, 1877.

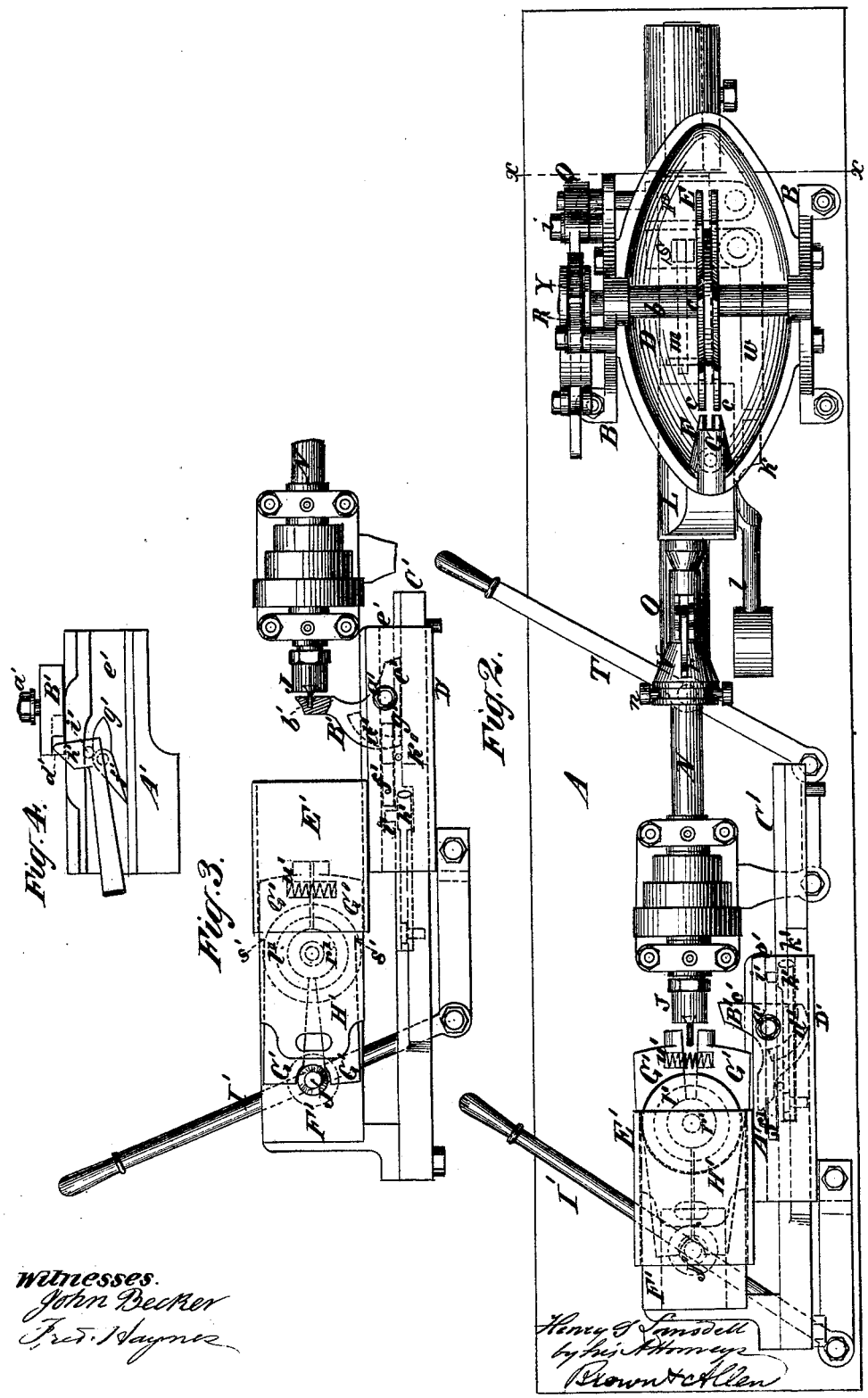

3 Sheets—Sheet 3.
H. S. LANSDELL.
MACHINE FOR THREADING METAL SCREWS.
No. 189,754. Patented April 17, 1877.
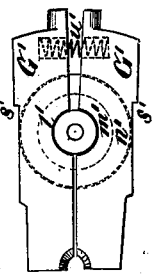
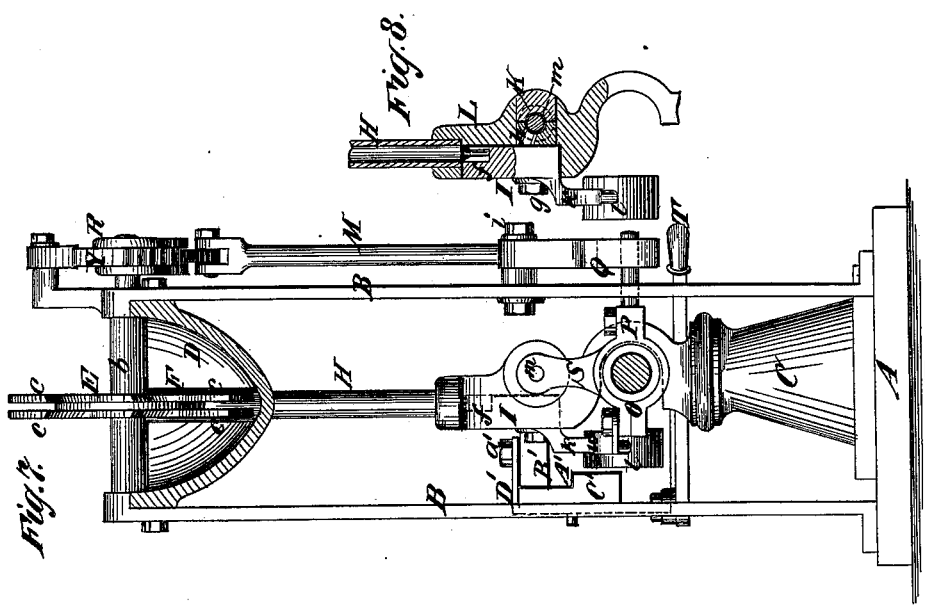
Witnesses
John Becker
Fred. Haynee
Henry S. Lansdell
by his Attorneys
Brown & Allen
N. PETERS, PHOTO-LITHOGRAPHER, WASHINGTON, D.C.

UNITED STATES PATENT OFFICE.

HENRY S. LANSDELL, OF BROOKLYN, NEW YORK, ASSIGNOR TO JOHN A. KERNOCHAN, OF PITTSFIELD, MASSACHUSETTS.

IMPROVEMENT IN MACHINES FOR THREADING METAL SCREWS.

Specification forming part of Letters Patent No. 189,754, dated April 17, 1877; application filed March 2, 1877.

*To all whom it may concern:*

Be it known that I, HENRY S. LANSDELL, of Brooklyn, in the county of Kings and State of New York, have invented certain Improvements in Machinery for Manufacturing Screws, of which the following is a full, clear, and exact description, reference being had to the accompanying drawing, forming part of this specification.

This invention is more particularly designed for making metal screws having nicked or slotted heads, and it will be particularly described with reference to the manufacture of such screws; but it is also applicable, in part, to the manufacture of other screws and to cutting screw-threads on the ends of rods.

The invention consists in various novel constructions and combinations of devices for feeding the screw-blanks, one by one, to a chuck which holds them while being screwed, the same feeding devices being also applicable for feeding screws or blanks to the device which cuts the slots in their heads. It also consists in means for centering the screw blanks or rods in relation with the screw-thread-cutting dies or devices, and in means for controlling and operating said dies.

In the application of said invention to the manufacture of screws having nicked or slotted heads, the screw-blanks are introduced promiscuously into an elevated basin or hopper, from which they are lifted by a rotating device and deposited, with their heads uppermost, in a slotted guide, which conveys them, one by one, and with their heads still uppermost, to a drop-tube, from the base of which they are separately taken by a vibrating carrier and passed, shank foremost, in line with a supply-tube, along which they are pushed lengthwise in a series, and from which they are projected, one at a time, by a plunger, into the chuck which holds them while being screwed. A centering device or tumbler is then brought to bear upon the point of the advanced and projecting screw-blank, to center it in the chuck relatively to the screwing-dies, which, then being closed, are advanced to cut the required thread on the blank, suitable rotary motion being at the same time communicated to the chuck or dies. The dies are then opened and the chuck is caused to liberate the screwed blank, which drops or is forced out by the action of the feeding-plunger upon the screw-blanks in the rear of it, and the dies subsequently retire. A similar feeding apparatus, having its details suitably organized for the purpose, may be used to conduct the screws or screw-blanks, head foremost, up to devices used for nicking the heads of the screws or screw-blanks, and for shaving said heads.

Figure 1 represents a partly sectional side view of a machine constructed in accordance with the invention, and as applied to the feeding of screw-blanks to the dies which cut the thread thereon, to the centering of said blanks in relation with said dies, and to the operation of the dies. Fig. 2 is a plan of the same, showing the screw-blank-centering device or tumbler in its retired position, and the screw-cutting dies as advanced and thrown open. Fig. 3 is a plan, in part, showing the centering-tumbler and screw-cutting dies. Fig. 4 is an interior side view of certain mechanism for operating the centering-tumbler. Figs. 5 and 6 are an under view and a longitudinal vertical section, respectively, of the screw-cutting dies. Fig. 7 is a vertical transverse section of the machine, mainly on the line $x\,x$. Fig. 8 is a vertical section, in direction of the length of the machine, of certain means used to pass the screw-blanks, one by one, from the drop-tube of the feeder to the tube which conveys them to the chuck employed to hold them while the thread is being cut upon their shanks.

A is a bed-plate, on which are erected side frames B and posts C for supporting the working parts of the machine. D is an elevated basin or hopper into which the screw-blanks to be operated on are thrown or fed. E is a rotating screw-blank lifter fast upon an operating shaft, $b$, arranged to work within the basin A. Said lifter is of a forked construction, being composed, for instance, of a series of duplicate radiating teeth or prongs, $c$, arranged at a suitable distance apart to admit the bodies of the screw-blanks $d$ between them, while the heads of said blanks rest upon the prongs as the lifter is rotated, and picks up up the screw-blanks, which thus are suspended, by their heads, on the duplicate prongs. F is a guide, against or in proximity to which the forks c, after having picked up the screw-blanks, move during the rotation of the lifter. This guide is provided, at its upper end, which is set inclining downwardly in an outward direction with a groove or passage, e, which is covered by a hood, G, arranged above the upper end of the guide, and which communicates with an upright or drop tube, H. The teeth or forks c of the screw-blank lifter E are so shaped or constructed that when the upper edges of each pair successively come into line, or thereabout, with the upper end or edges of the grooved guide F, they assume an angle that will cause the suspended screw-blanks to slide off them and into the groove e, with their heads on the upper end of the grooved guide, and so that they will slide down or along said guide, and said screw-blanks ultimately be delivered, head uppermost, into the drop-tube H. The hood G over the upper end of the grooved guide F prevents any screw-blanks which may have been raised by the lifter E in a crosswise position on each pair of forks c, or in any other position than that which causes them to be suspended between the prongs by their heads, from passing into or upon the grooved guide F, to interfere with the proper action of the latter, and such hood G further serving to cause said improperly-lifted screw-blanks to fall back into the basin D. If desired, a spring having a hooked end may be fitted on the hood G, or be otherwise disposed, to prevent the passage of more than one screw-blank at a time into the grooved guide F, and also to insure such separate passage of the blanks.

As the screw-blanks are passed, as described, into the drop-tube H, with their heads uppermost, they fall, by their own weight, one after the other, to the bottom of said tube and from thence into a cavity, $f$, formed in the inner side or surface of a carrier, I, and opening through the periphery thereof. This carrier receives the screw-blanks one by one, as it is required to keep up a supply of them to a chuck, J, at the end of a supply-tube, K, and to keep said tube always full, so that as one screw-blank enters the chuck another blank is deposited by the carrier in the tube leading to the chuck.

This carrier I consists of a sector-shaped plate oscillating on a central pivot, $g$, within the sector-shaped interior of a carrier-box, L, into which the lower end of the drop-tube H opens. The cavity $f$ of this carrier is of proper form for a screw to drop into it from the drop-tube H in an upright position, when the said cavity is presented, by the oscillation of the carrier, directly under the said tube. The said cavity $f$ opens into the back or upright inner face of the carrier, which works close to the back of the interior of the carrier-box L, as shown in Fig. 8, and the screw or blank is therefore kept in the said cavity during the oscillation of the carrier until the said cavity arrives with the screw or blank, in a horizontal position, opposite to a cavity, $h$, (see Fig. 8,) in the lower part of the back of the box L, the said cavity having a downward inclination from the interior of the box L, so that the screw or blank rolls down into it by its own weight, and is confined therein by the carrier, when the latter is turned back to put its cavity $f$ in line again with the drop tube H. When the carrier I is turned to close the tube H and bring its cavity $f$ in line with the cavity $h$ in the box L, the supply of blanks $d$ from the tube H is shut off. In this way only one screw-blank can enter the carrier I at a time.

The carrier I is vibrated backward and forward by means of a toe, $k$, on said carrier, actuated by reciprocating devices, as hereinafter described, and by a weighted lever, $l$, also attached to said carrier.

After the screw-blank, during the vibration of the carrier I, has passed into the cavity $h$ in the box L, through which and in line with said cavity there is a horizontal tubular passage, communicating with the tube K, that leads to the chuck J, and which tube is contained within a hollow revolving mandrel, N, a plunger, $m$, operated by a sliding and reciprocating mandrel, O, forces said blank through the tubular passage in the box L into the tube K, which latter, by successive actions of the carrier I, becomes filled with screw-blanks, lying in regular order one behind the other, with the points foremost. At each forward movement of the plunger $m$ one screw-blank $d$ will be forced into the chuck J. The same forward movement of the plunger $m$ which forces the blank into the chuck J actuates the carrier I to close the tube H, which supplies said carrier with blanks, one at a time, and the blank-receiving cavity $f$ in said carrier is, at the same time and by the same motion of the carrier, brought opposite the cavity $h$ in the box L, thereby causing the screw-blank within the cavity $f$ to fall into the cavity $h$, and be deposited upon the upper surface of the plunger $m$. A backward motion of the mandrel O is then caused to close the chuck, so that it gripes the foremost screw-blank on or immediately in front of its head, and the same backward motion of the mandrel O carries back the plunger $m$, and allows the screw-blank which was resting upon it to fall into the tubular passage in the box L, leading to the tube K, and to assume a position ready to be driven forward by the next forward motion of the plunger $m$.

The weighted lever on the carrier I actuates the vibrating carrier I to bring its cavity $f$ under the drop-tube H during the backward movement of the mandrel O, when operating pressure or action is removed from the toe $k$ on said carrier.

The reciprocating mandrel O, or it may be any other equivalent device, has secured to it an adjustable arm, P, which operates the lower arm of a bell-crank, Q. This bell-crank Q moves on an adjustable axis, $i$, and to its upper end, which is provided with suitable means for adjusting its length of throw, is connected a rod, M, the upper end of which is attached to a lever, R, and whereby said lever is made to receive a vibrating motion, and thereby to intermittingly revolve a ratchet-wheel, Y, on the shaft $b$ of the screw-blank lifter E, to operate the latter. Instead, however, of this intermittent ratchet operation of the lifter E, the latter may be rotated by means of a pulley.

The reciprocating sliding mandrel O has the plunger $m$ connected with it by an arm, S, which is adjustable on or along said mandrel to adapt the plunger to different lengths of screw-blanks. The same arm, S, or socket portion of the same, carries a bar, $w$, which may also be adjustable, and which serves, during each forward movement of the mandrel O, to strike the toe $k$ of the carrier I, and cause said carrier to turn, so that its cavity $f$ is brought laterally opposite the blank-cavity $h$ in the box L, and in line with the tube M, preparatory to its return by the weighted lever $l$, to bring the cavity $f$ in line with the drop-tube H.

The sliding mandrel O is reciprocated or moved backward and forward by means of a cam or any other suitable motion, but is here shown as actuated by a lever, T. This lever T may also be made to control the timely opening and closing of the chuck J by means of any suitable interposed devices—as, for instance, by a fork, $n$, sliding cone V, and bell-crank levers $r$—that, as the mandrel O is worked backward, operate upon a tube arranged within the mandrel, and provided with a female sliding cone, which relieves the spring-jaws of the chuck J of their griping or holding pressure on the work; but these devices and the construction of the chuck form no part of this invention.

Thus it will be seen that the same motion of the lever T causes the screw-blanks to be picked up by the lifter E, and to be transferred by the carrier I, with their heads and points in proper position, and to be conveyed one by one, in succession, to the chuck J, and may likewise be used to secure them there ready to be operated upon by the centering and thread-cutting devices.

Such previous description explains the mode of bringing the blanks $d$, one by one, into the chuck J; but before said blanks can be further operated upon by the dies for cutting the threads thereon, it is necessary that they should be truly centered in the chuck. This is secured by a special centering device, which is constructed as follows: Upon a fixed block, A', arranged to one side of the chuck J, is mounted by pivot $a'$ a centering pivoted tumbler or lever, B', having a centering-cavity, $b'$, at its one end to receive the point of each blank as its shank is projected through the chuck and beyond the face of the latter a sufficient distance to permit the head of said blank being griped by the chuck. The other end of said centering-tumbler B' is formed with a flat bearing-surface, $c'$, by which, as hereinafter described, the tumbler B' is held firmly and rigidly in position while a screw-blank is being centered in and griped by the chuck. The under side of the centering-tumbler B' has a curved slot, $d'$, in it. The back of the block A' is provided (see Fig. 4) with a longitudinal groove, $e'$, having within it a pointed switch, $f'$, pivoted in its rear to the block A', and provided at its back with a fixed guide, $g'$. Arranged to reciprocate longitudinally within or along and outside of the grooved block A' is a slide, C', provided at its inner face with a pivoted lever-catch, $h'$, which has a stud or pin, $i'$, on its one side near its front end. When the slide C' is moved forward in or along the groove $e'$ of the fixed block A', the stud $i'$ slides on and along the upper surface of the switch $f'$, and causes the free end of the lever-catch $h'$ to enter, through an upper opening in said slide, the curved slot $d'$ in the centering-tumbler B'. This causes said lever to turn on its pivot $a$ out of the way of the thread-cutting dies or tools, which will then be advancing to operate upon the screw-blank in the chuck. When, however, the stud $i'$ has ascended the switch $f'$, (which then forms a rising incline,) and has passed along the guide $g'$, it slips off the latter, and so causes the lever-catch $h'$ to drop and disengage itself from the centering-tumbler B'. A reverse or backward motion of the slide C' then carries the stud $i'$ of the lever-catch under the guide $g'$ and pivoted switch $f'$, which latter then drops to its normal position. As the slide C' completes its backward movement a projection, $k'$, on it strikes the centering-tumbler B', and turns it into position to receive within its centering-cavity $b'$ another screw-blank under gripe of the chuck J.

Outside of the fixed block A' is a fixed guard or projection, D', between which and the block A' the slide C' moves. This projection D' is constructed with a flat or straight surface on its inner side, against which the flat bearing-surface $c'$ of the centering-tumbler B' rests, when the latter is adjusted, as described, to receive within it the point or shank of the screw-blank held by the chuck. This locks the centering-tumbler B' when turned or adjusted to center a screw-blank.

The centering-tumbler B' and other portions of the centering apparatus may be attached to and operated by and with the revolving and sliding head of any screw-cutting machine, or it may be attached to any suitable lathe, and the slide bringing the work into contact with the dies be operated by an independent lever or by and with any suitable device thereon. Said centering device or tumbler can also be used advantageously for centering the ends of rods or bars requiring screw-threads to be cut on their ends, also for determining the lengths of such bars or rods projecting beyond the hollow mandrel which carries them. It will suffice here, however, to describe it in connection with the devices shown in the drawing for cutting threads upon screw-blanks or rods, and for releasing them expeditiously from the dies in which the threads have been cut.

E' is a frame, in which the die-holders slide; and F', a die-carrying bed, arranged to slide within or through said frame. G' G' are the die-holders, which are attached to the bed F'. These die-holders are each constructed to hold one-half of a divided or split die at their forward end and have each a semicircular recess, l', formed at or near their centers. These semicircular recesses are surrounded by concentric lips or walls m', (see Figs. 5, 6,) which, in their turn are surrounded by semicircular grooves or channels n'. Thus constructed, said die-holders G' are bound together by a top-plate, H', constructed to project down within the semicircular recesses l', so as to form a central stud for the die-holders to turn upon, and being, furthermore, constructed with an annular rim or lip, o', which projects down within the grooves n' of the die-holders. A central stud, r', a set-screw, or other suitable means, serve to hold these devices in position on the bed F'. The die-holders G' G' are fitted into the frame E', so as to hold them closed while the bed F' is being slid forward by a lever, I', until the thread has been cut upon the screw blank held by the chuck J; but when the desired length of thread has been cut, the die-holders G' G' will have been projected sufficiently far out or in front of the frame E' to cause reduced portions s', formed on the outer edges of said holders, to be thrown outward by a spiral spring, u', which opens the dies, and so releases the screw-blank which has been threaded, and allows the die-holders to be carried back again. But, before the die-holders G' G' can be carried back again, a wedge, J', through which the lever I' passes, is raised by said lever and forced between inclined surfaces at the rear ends of the die-holders, so as to close the forward ends of the die-holders. The slide C', which operates the centering-tumbler B', is connected to the rear end of the sliding-die bed F', so that the same lever I' controls the die-holders G' G', the wedge J', and centering-tumbler B'.

Instead of the frame E' being made with parallel sides, as shown in the drawing, it may be formed with diverging sides, so that the die-holders will be gradually spread apart as they are moved forward, to provide for cutting threads on tapering screw shanks or rods. Furthermore, instead of the sliding die-holders, hereinbefore described, there may be used, in connection with the screw-blank feeding and holding devices, what is known as a revolving turret-head, or a die which is stationary while cutting the screw, but which, after the screw has been cut, revolves at a greater speed than the screw does therein, so as to draw itself off the screw, or any other kind of screw-cutting die or screw-plate may be used.

When the screw or screw-blank feeding apparatus hereinbefore described is used in connection with devices for slotting or nicking and shaving the heads of said articles, the plunger m, that passes the blank or screw from the carrier I to the chuck J of the revolving mandrel N, is reversed in its relation to the carrier I, so as to feed the screws or blanks with their heads foremost. Centering and stopping devices, similar to those hereinbefore described, may be used to center and stop the screw or screw-blank when thus fed forward up to a nicking-saw, and to any suitable tool, for shaving the heads of said screws or screw-blanks.

It will be obvious that the apparatus for feeding and nicking and shaving the heads of the screws or screw-blanks may be distinct from the apparatus for feeding and cutting the threads in said screw-blanks, or such two apparatus may be connected or arranged to work in regular consecutive relation—as, for instance, by arranging a second basin or hopper, similar to the one D, under the chuck J of the blank-screw apparatus, so that as said blanks are delivered from the screwing apparatus they are conveyed by gravity to the head nicking and shaving apparatus.

Instead of the different operations being controlled by hand or hand-levers, as hereinbefore described, they may be effected in regular consecutive relation, and automatically by steam or other like power, for which purpose various mechanical devices may be used, none of which it is necessary here to describe.

I claim—

1. The combination of the rotating screw-blank lifter E having a series of duplicate radiating teeth or prongs, c, with the basin and its hood G and grooved guide F, all constructed and arranged to operate in connection with the drop-tube, substantially as described.

2. The combination of the oscillating carrier I, constructed with a cavity, f, for receiving the screw-blanks or screws in an upright or nearly upright position, and the carrier-box L, containing the said carrier, and having a cavity, h, into which the blanks or screws are delivered in a horizontal or nearly horizontal position, substantially as herein described.

3. The combination of the plunger m, the supply-tube K to the chuck J, the box L, having a screw or blank-receiving cavity, h, and the screw or screw-blank carrier I, essentially as described.

4. The combination of the sliding mandrel O, which carries the plunger m, the arm P, secured on said mandrel, the bell-crank Q, and the rotating screw or screw-blank lifter E, whereby the movement of the said mandrel for forcing the blanks into the chuck is made to operate the said lifter, substantially as herein described.

5. The combination of the sliding mandrel O, the arm S, the bar w, and the toe k of the carrier I, essentially as described.

6. The combination, with the chuck J, which holds the work to be threaded, of a centering-tumbler, B', constructed to operate substantially as and for the purposes herein set forth.

7. The combination, with mechanism for holding and threading the screw-blanks of the centering-tumbler B', substantially as herein described.

8. The combination of the slide C', with the pivoted centering-tumbler B', the switch f', the fixed guide g', and the lever-catch h', having a stud or pin, i', essentially as and for the purpose herein set forth.

9. The combination of the fixed guard or projection D', with the pivoted centering-tumbler B' constructed with a bearing or resting surface, c', substantially as described.

10. The die-holders G' G', in combination with the plate H', constructed to concentrically enter said die-holders, essentially as described.

11. The combination of the cone or wedge J' with the pivoted or swinging die-holders G' G', having reduced portions s', and the frame E', in which said die-holders slide, substantially as specified.

HENRY S. LANSDELL.

Witnesses:
   BENJAMIN W. HOFFMAN,
   FRED. HAYNES.